(12) United States Patent
Choi

(10) Patent No.: US 9,845,737 B2
(45) Date of Patent: Dec. 19, 2017

(54) ENGINE SYSTEM

(71) Applicant: HYUNDAI MOTOR COMPANY, Seoul (KR)

(72) Inventor: Byong Young Choi, Bucheon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 18 days.

(21) Appl. No.: 14/939,967

(22) Filed: Nov. 12, 2015

(65) Prior Publication Data
US 2016/0369709 A1 Dec. 22, 2016

(30) Foreign Application Priority Data

Jun. 19, 2015 (KR) .................. 10-2015-0087551

(51) Int. Cl.
*F02B 25/14* (2006.01)
*F02D 13/02* (2006.01)
(Continued)

(52) U.S. Cl.
CPC ....... *F02D 13/0276* (2013.01); *F01N 13/107* (2013.01); *F02B 25/145* (2013.01); *F02D 13/0249* (2013.01); *F02D 13/0257* (2013.01); *F02M 26/07* (2016.02); *F02M 26/14* (2016.02); *F02M 26/23* (2016.02); *F02M 26/41* (2016.02); *F02D 13/0207* (2013.01); *F02D 13/06* (2013.01)

(58) Field of Classification Search
CPC ........... F02M 25/0719; F02M 25/0709; F02M 25/0726; F02M 25/0744; F02M 25/0788
See application file for complete search history.

(56) References Cited

U.S. PATENT DOCUMENTS

| 5,727,533 A * | 3/1998 | Bidner ................... | F02M 26/49 |
| | | | 123/568.16 |
| 6,742,506 B1 * | 6/2004 | Grandin ................. | F02B 37/00 |
| | | | 123/568.12 |

(Continued)

FOREIGN PATENT DOCUMENTS

| JP | 2009-174457 A | 8/2009 |
| JP | 2010-024974 A | 2/2010 |

(Continued)

OTHER PUBLICATIONS

JP 2010-024974, Machine translated on Jan. 19, 2017.*
JP 2010-255603, Machine Translated on Jan. 19, 2017.*

*Primary Examiner* — Patrick Maines
(74) *Attorney, Agent, or Firm* — McDermott Will & Emery LLP

(57) ABSTRACT

An engine system includes main exhaust ports fluidly communicating with each combustion chamber. An exhaust variable valve lift apparatus controls an operation of a main exhaust valve which closes or opens each main exhaust port. A main exhaust manifold is connected with the main exhaust ports. Scavenge exhaust ports fluidly communicate with each combustion chamber. A variable scavenge apparatus controls an operation of a scavenge valve which closes and opens each scavenge exhaust port. A scavenge manifold is connected with the scavenge exhaust ports. A controller is configured to control operations of the exhaust variable valve lift apparatus and the variable scavenge apparatus according to a vehicle operation state.

17 Claims, 4 Drawing Sheets

(51) Int. Cl.
*F02M 26/41* (2016.01)
*F01N 13/10* (2010.01)
*F02M 26/23* (2016.01)
*F02M 26/07* (2016.01)
*F02M 26/14* (2016.01)
*F02D 13/06* (2006.01)

(56) References Cited

U.S. PATENT DOCUMENTS

| | | | | |
|---|---|---|---|---|
| 2006/0157009 A1* | 7/2006 | Gaessler | ............ | F01L 9/02 123/90.11 |
| 2011/0167815 A1* | 7/2011 | Ulrey | ............ | F02D 13/0249 60/602 |
| 2012/0060492 A1* | 3/2012 | Pursifull | ............ | F02D 13/0249 60/602 |
| 2013/0340727 A1* | 12/2013 | Keating | ............ | F02M 26/41 123/568.11 |
| 2013/0340728 A1* | 12/2013 | Keating | ............ | F02D 13/0249 123/568.11 |
| 2014/0069082 A1* | 3/2014 | Alger, II | ............ | F02M 26/43 60/274 |

FOREIGN PATENT DOCUMENTS

| | | | |
|---|---|---|---|
| JP | 2010024974 A | * | 2/2010 |
| JP | 4479774 B2 | | 6/2010 |
| JP | 2010-255603 A | | 11/2010 |
| JP | 2010255603 A | * | 11/2010 |
| JP | 2011-196196 A | | 10/2011 |
| JP | 2011196196 A | * | 10/2011 |
| KR | 10-1063485 B1 | | 9/2011 |

* cited by examiner

ENGINE SYSTEM

CROSS-REFERENCE TO RELATED APPLICATION

This application claims the benefit of priority to Korean Patent Application No. 10-2015-0087551 filed in the Korean Intellectual Property Office on Jun. 19, 2015, the entire content of which is incorporated herein by reference.

TECHNICAL FIELD

The present disclosure relates to an engine system. More particularly, the present disclosure relates to an engine system which may reduce unburned gas.

BACKGROUND

Environmental problem has been one of major issues, and thus, regulations for vehicle exhaust gas have been reinforced.

The auto industries focus on an exhaust system to reduce harmful element in exhaust gas, to reduce unburned gas, and to improve fuel consumption.

A conventional internal combustion engine includes two intake valves and two exhaust valves from which the exhaust gas is exhausted and joined at one exhaust port. In the conventional engine, reducing unburned gas within the exhaust gas is limited.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide an engine system which may reduce unburned gas.

An engine system according to an exemplary embodiment of the present inventive concept includes main exhaust ports fluidly communicating with each combustion chamber, an exhaust variable valve lift apparatus controlling an operation of a main exhaust valve which closes or opens each main exhaust port, a main exhaust manifold connected with the main exhaust ports, scavenge exhaust ports fluidly communicating with each combustion chamber, a variable scavenge apparatus controlling an operation of a scavenge valve which closes and opens each scavenge exhaust port, a scavenge manifold connected with the scavenge exhaust ports, and a controller configured to control operations of the exhaust variable valve lift apparatus and the variable scavenge apparatus according to a vehicle operation state.

The exhaust variable valve lift apparatus may be selectively operated in a short duration mode and a long duration mode of which an opening duration of the main exhaust valve is longer than an opening duration of the short duration mode according to the control of the controller. The variable scavenge apparatus may be selectively operated in a normal mode and a cylinder de-activation (CDA) mode of which the scavenge valve is closed according to the control of the controller.

According to the vehicle operation state, the controller may control the exhaust variable valve lift apparatus to be operated in the short duration mode and the variable scavenge apparatus to be operated in the normal mode, or control the exhaust variable valve lift apparatus to be operated in the long duration mode and the variable scavenge apparatus to be operated in the CDA mode.

When the exhaust variable valve lift apparatus is operated in the short duration mode, a closing time of the main exhaust valve may be earlier than an exhaust top dead center. When the exhaust variable valve lift apparatus is operated in the long duration mode, the closing time of the main exhaust valve may be later than the exhaust top dead center.

When the variable scavenge apparatus is operated in the normal mode, the scavenge valve may be opened later than an opening time of the main exhaust valve and may be closed later than a closing time of the main exhaust valve.

A valve lift and a valve duration of the scavenge valve may be smaller than a valve lift and a valve duration of the main exhaust valve.

The scavenge valve may be opened near an exhaust top dead center.

A valve lift where valve profiles of the scavenge valve and the main exhaust valve are crossed may be less than 2.0 mm.

A valve lift where valve profiles of the scavenge valve and an intake valve are crossed may be more than 80% of a maximum lift of the scavenge valve.

The engine system may further include a turbocharger. Exhaust gas passing through the main exhaust manifold may pass through a turbine of the turbocharger, and a part of the exhaust gas passing through the scavenge manifold may pass through a compressor of the turbocharger before being supplied to the combustion chamber.

The engine system may further include an exhaust gas recirculation (EGR) cooler. The part of the exhaust gas passing through the scavenge manifold passes through the EGR cooler before being supplied to the combustion chamber.

A diameter of the scavenge exhaust port may be less than a diameter of the main exhaust port.

An engine system according to another exemplary embodiment of the present inventive concept include: main exhaust ports fluidly communicating with each combustion chamber, an exhaust variable valve lift apparatus controlling an operation of a main exhaust valve which closes or opens each main exhaust port, a main exhaust manifold connected with the main exhaust ports, a main exhaust manifold connected with the main exhaust ports, scavenge exhaust ports fluidly communicating with each combustion chamber, a variable scavenge apparatus controlling an operation of a scavenge valve which closes and opens each scavenge exhaust port, a scavenge manifold fluidly connected with the scavenge exhaust ports, an engine operation state detecting portion including an rpm sensor, and a controller configured to control operations of the exhaust variable valve lift apparatus and the variable scavenge apparatus according to an output signal of the engine operation state detecting portion.

The exhaust variable valve lift apparatus may be selectively operated in a short duration mode and a long duration mode of which an opening duration of the main exhaust valve is longer than an opening duration of the short duration mode according to control of the controller. The variable scavenge apparatus may be selectively operated in a normal mode and a CDA mode of which the scavenge valve is closed according to control of the controller.

According to a vehicle operation state including the rpm signal, the controller may control the exhaust variable valve lift apparatus to be operated in the short duration mode and the variable scavenge apparatus to be operated in the normal mode, or may control the exhaust variable valve lift apparatus to be operated in the long duration mode and the variable scavenge apparatus to be operated in the CDA mode.

When the variable scavenge apparatus is operated in the normal mode, the scavenge valve may be opened later than an opening time of the main exhaust valve and may be closed later than a closing time of the main exhaust valve.

A valve lift and a valve duration of the scavenge valve may be smaller than a valve lift and a valve duration of the main exhaust valve. The scavenge valve may be opened near an exhaust top dead center. A valve lift where valve profiles of the scavenge valve and the main exhaust valve are crossed may be less than 2.0 mm.

A valve lift where valve profiles of the scavenge valve and an intake valve are crossed may be more than 80% of a maximum lift of the scavenge valve.

A diameter of the scavenge exhaust port may be less than a diameter of the main exhaust port.

According to the exemplary embodiment of the present inventive concept, the engine system may reduce unburned gas by providing a scavenge manifold.

Further, the engine system may improve fuel consumption in low and middle speeds and improve output in high speed.

DETAILED DESCRIPTION OF THE EMBODIMENTS

Figure 1:
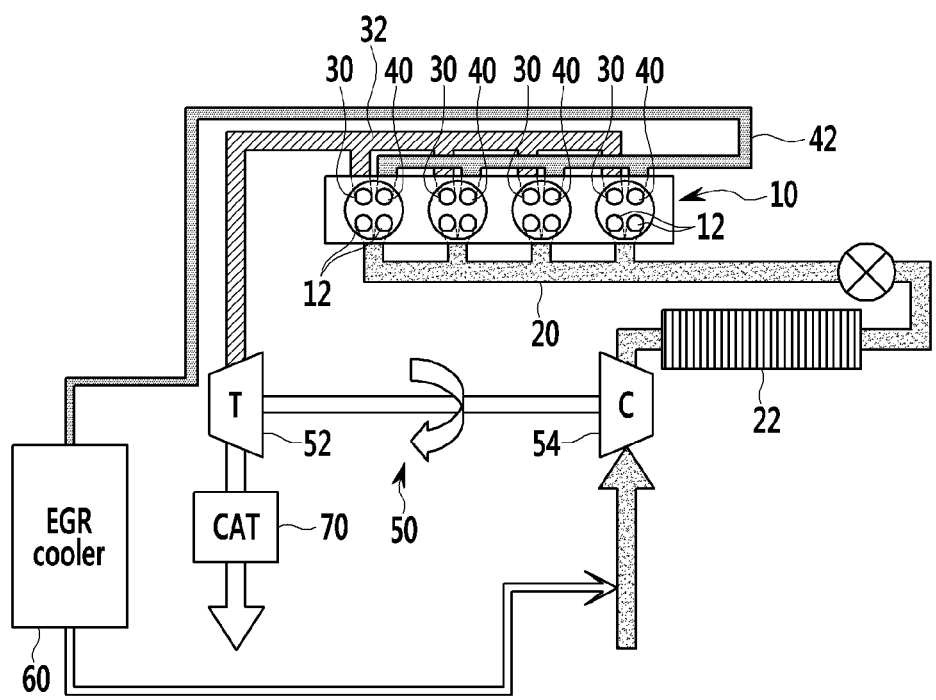
FIG. 1 is a schematic diagram of an engine system according to an exemplary embodiment of the present inventive concept.

In the following detailed description, only certain exemplary embodiments of the present inventive concept have been shown and described, simply by way of illustration.

As those skilled in the art would realize, the described embodiments may be modified in various different ways, all without departing from the spirit or scope of the present invention A part irrelevant to the description will be omitted to clearly describe the present invention, and the same or similar elements will be designated by the same reference numerals throughout the specification.

In the drawings, the thickness of layers, films, panels, regions, etc., are exaggerated for clarity.

Throughout the specification and the claims, unless explicitly described to the contrary, the word "comprise" and variations such as "comprises" or "comprising" will be understood to imply the inclusion of stated elements but not the exclusion of any other elements.

An exemplary embodiment of the present inventive concept will hereinafter be described in detail with reference to the accompanying drawings.

Figure 2:
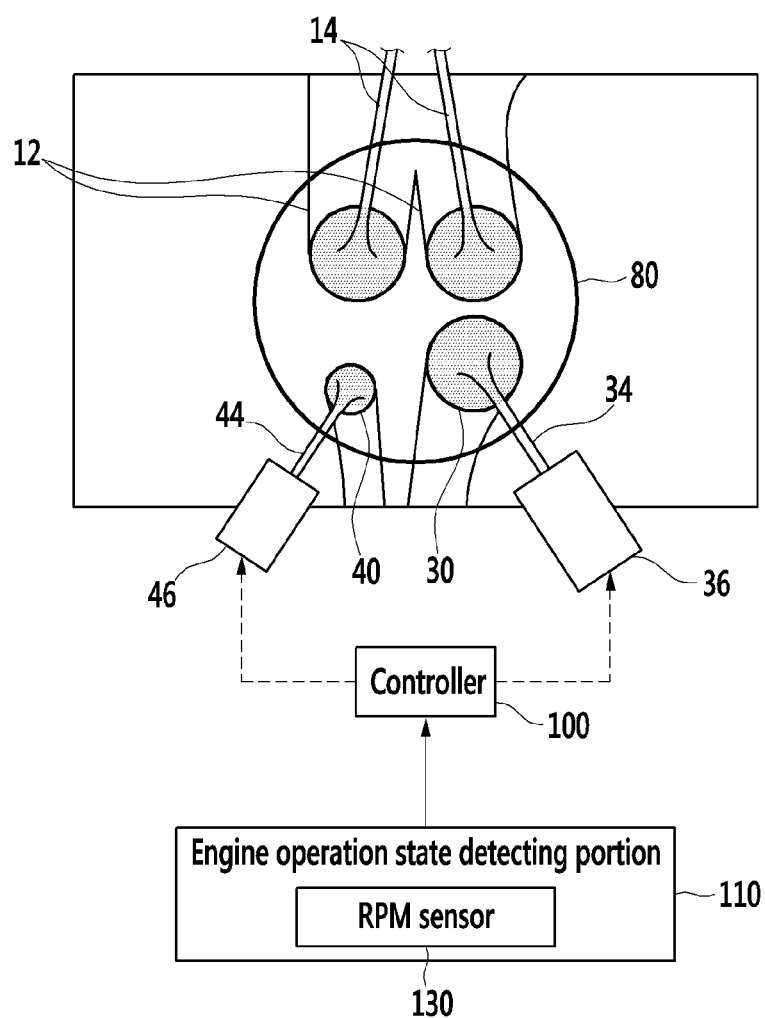
FIG. 2 is a drawing showing intake ports and exhaust ports of an engine system according to an exemplary embodiment of the present inventive concept.

FIG. 1 is a schematic diagram of an engine system according to an exemplary embodiment of the present inventive concept, and FIG. 2 is a drawing showing intake ports and exhaust ports of an engine system according to an exemplary embodiment of the present inventive concept.

Referring to FIGS. 1 and 2, an engine system according the present disclosure includes main exhaust ports 30 fluidly communicating with each combustion chamber 80. An exhaust variable valve lift apparatus 36 controls an operation of a main exhaust valve 34 which closes or opens each main exhaust port 30. A main exhaust manifold 32 is connected with the main exhaust ports 30. Scavenge exhaust ports 40 fluidly communicate with each combustion chamber 80. A variable scavenge apparatus 46 controls an operation of a scavenge valve 44 which closes and opens each scavenge exhaust port 40. A scavenge manifold 42 is connected with the scavenge exhaust ports 40 and a controller 100 which is configured to control operations of the exhaust variable valve lift apparatus 36 and the variable scavenge apparatus 46 according to a vehicle operation state.

Air passing through a charge air cooler 22 is supplied to the combustion chamber 80 through an intake manifold 20 and intake ports 12. Exhaust gas passing through the combustion chamber 80 is exhausted through the main exhaust manifold 32. At least a part of the exhaust gas passing through the scavenge manifold 42 is re-circulated to the combustion chamber 80 to be burned.

The engine system may further include a turbocharger 50. The exhaust gas passing through the main exhaust manifold 32 passes through a turbine 52 of the turbocharger 50. A part of the exhaust gas passing through the scavenge manifold 42 passes through a compressor 54 of the turbocharger 50 and then is supplied to the combustion chamber 80 with fresh air supplied into the combustion chamber 80. The remaining exhaust gas passing through the scavenge manifold 42 may be exhausted to outside.

In the drawing, while all of the exhaust gas passing through the scavenge manifold 42 recirculates to the engine 10, it is not limited thereto. On the contrary, a part of the exhaust gas may be exhausted to the outside without recirculation.

The engine system may further include an exhaust gas recirculation (EGR) cooler 60. The part of the exhaust gas passing through the scavenge manifold 42 passes through the EGR cooler 60 and then is supplied to the combustion chamber 80.

The remaining exhaust gas passing through the scavenge manifold 42 and the exhaust gas passing through the main exhaust manifold 32 pass through a catalyst 70 to be cleaned and then are exhausted.

Figure 3:
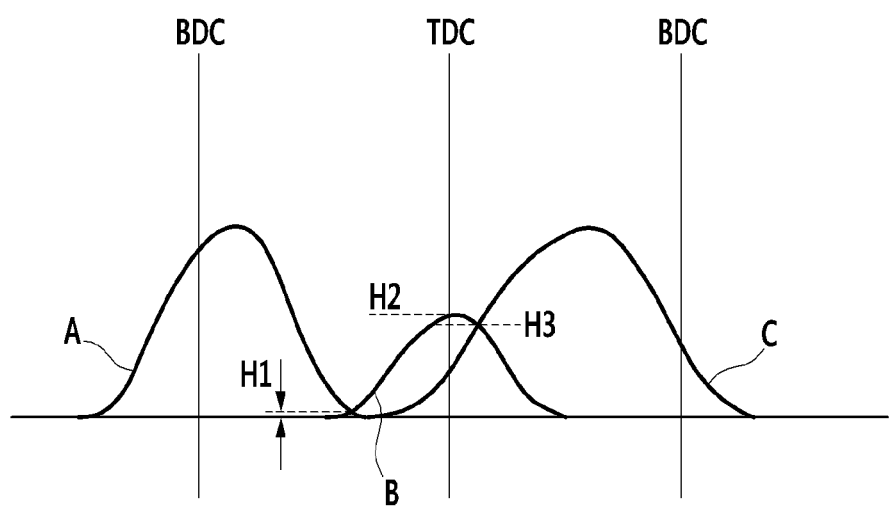
FIG. 3 and FIG. 4 are graphs of valve profiles of an engine system according to an exemplary embodiment of the present inventive concept.
Figure 4:
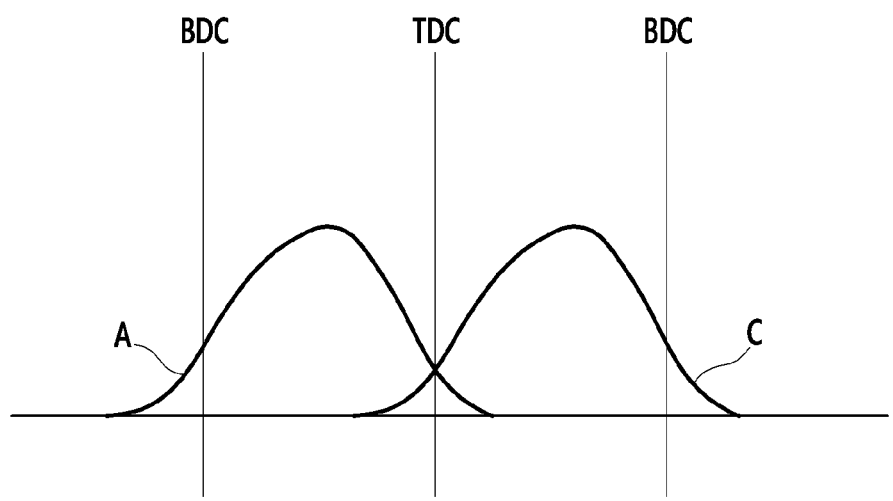

FIGS. 3 and 4 are graphs of valve profiles of an engine system according to an exemplary embodiment of the present inventive concept.

In FIGS. 3 and 4, "A" indicates valve profile of the main exhaust valve, "B" indicates valve profile of the scavenge valve, and "C" indicates valve profile of an intake valve.

The exhaust variable valve lift apparatus 36 may be selectively operated in a short duration mode and a long duration mode of which opening duration of the main exhaust valve 34 is longer than opening duration of the short duration mode according to control of the controller 100.

In the present disclosure, the exhaust variable valve lift apparatus 36 may be a continuous variable valve lift (CVVL) apparatus, a variable valve lift (VVL) apparatus, a continuous variable valve duration (CVVD) apparatus, or a variable valve duration (VVD) apparatus which may be operated as the long duration mode and the short duration mode.

The variable scavenge apparatus 46 may be operated in a normal mode and a cylinder de-activation (CDA)) mode according to control of the controller 100.

In the present disclosure, the variable scavenge apparatus 46 may be operated in the normal mode of which the scavenge valve 44 is normally opened and closed, and in the CDA mode of which the scavenge valve 44 is closed and not opened.

An intake valve 14 closes and opens the intake port 12, and a variable valve lift apparatus may change an operation mode of the intake valve 14.

According to the vehicle operation state, the controller 100 may control the exhaust variable valve lift apparatus 36 to be operated in the short duration mode and the variable scavenge apparatus 46 to be operated in the normal mode.

The controller 100 may control the exhaust variable valve lift apparatus 36 to be operated in the long duration mode and the variable scavenge apparatus 46 to be operated in the CDA mode.

When the exhaust variable valve lift apparatus 36 is operated in the short duration mode, a closing time of the main exhaust valve 34 may be earlier than an exhaust top dead center. When the exhaust variable valve lift apparatus 36 is operated in the long duration mode, a closing time of the main exhaust valve 34 may be later than the exhaust top dead center.

When the variable scavenge apparatus 46 is operated in the normal mode, the scavenge valve 44 may be opened later than opening time of the main exhaust valve 34 and may be closed later than closing time of the main exhaust valve 34. The scavenge valve 44 may be opened near the exhaust top dead center. That is, the scavenge valve 44 is opened before the exhaust top dead center and closed after the exhaust top dead center.

As shown in FIG. 3, the scavenge valve 44 is opened later than the opening time of the main exhaust valve 34 and closed later than the closing time of the main exhaust valve 34.

In exhaust blowdown, high temperature and high pressure exhaust gas is exhausted, and then, relatively low temperature and low pressure exhaust gas (so-called as scavenging) is exhausted.

In scavenging, a relatively large amount of unburned gas is contained in the exhaust gas, and particularly, most of the unburned gas is exhausted at valve overlap moment when an intake valve and an exhaust valve are simultaneously opened.

Air-fuel mix may be remained in crevice volumes such as piston ring groove and so on and it is exhausted as unburned gas at the end of exhaust stroke, that is in scavenging. Thus, a relatively large amount of the unburned gas is contained during the scavenging.

In the present disclosure, a large amount of unburned gas, which may be generated in valve overlap, is re-circulated to be re-burned. Thus, harmful element in the exhaust gas may be reduced and fuel consumption may be improved.

That is, in low and middle speeds, as shown in FIG. 3, the scavenge valve 44 is opened near the exhaust top dead center, and the main exhaust valve 34 is opened near an exhaust bottom dead center. Thus, unburned gas may recirculate so that fuel consumption may be improved.

In a high speed, as shown in FIG. 4, the scavenge valve 44 is closed and the main exhaust valve 34 is opened more, for example, is closed later than the exhaust top dead center so as that output may be improved.

As shown in FIG. 3, a valve lift and a valve duration of the scavenge valve 44 is less than a valve lift and a valve duration of the main exhaust valve 34.

For example, the valve duration of the scavenge valve 44 is less than 140 degrees which is relatively less than the valve duration of the main exhaust valve 34.

Lift "H1" where valve profiles of the scavenge valve 44 and the main exhaust valve 34 are crossed is less than 2.0 mm. By reducing the opening time of the scavenge valve 44 and the main exhaust valve 34, mutual interference of the scavenge valve 44 and the main exhaust valve 34 may be reduced.

Lift "H3" where valve profiles of the scavenge valve 44 and the intake valve 14 are crossed is more than 80% of a maximum lift H2 of the scavenge valve 44. By increasing the simultaneous opening time of the scavenge valve 44 and the intake valve 14, re-circulation of the unburned gas may be enhanced.

Referring back to FIG. 2, a diameter of the scavenge exhaust port 40 is less than a diameter of the main exhaust port 30. Thus, exhaust resistance may be reduced and engine performance may be improved.

In the present disclosure, the engine system may further include an engine operation state detecting portion 110 including a revolutions per minute (RPM) sensor 130, and controller 100 may control operations of the exhaust variable valve lift apparatus 36 and the variable scavenge apparatus 46 according to an output signal of the engine operation state detecting portion 110.

For example, the controller 100 determines whether the engine is operated in the low and middle speeds or in the high speed according to an output signal of the engine operation state detecting portion 110 and may control the exhaust variable valve lift apparatus 36 and the variable scavenge apparatus 46. The low, the middle, and the high speeds may be determined according to a required output, a scavenge gas exhaust amount, and so on.

As described above, according to the present disclosure, the engine system may reduce unburned gas by providing a scavenge manifold, improve fuel consumption in low and middle speeds, and improve an engine output in the high speed.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. An engine system comprising:
   main exhaust ports fluidly communicating with each combustion chamber;
   a main exhaust valve configured to be operated to close or open each main exhaust port;
   a main exhaust manifold connected with the main exhaust ports;
   scavenge exhaust ports fluidly communicating with each combustion chamber;
   a scavenge valve configured to be operated to close or open each scavenge exhaust port;
   a scavenge manifold connected with the scavenge exhaust ports; and
   a controller configured to control the operations of the main exhaust valve and the scavenge valve according to a vehicle operation state,
   wherein when the main exhaust valve is operated in a short duration mode, a closing time of the main exhaust valve is earlier than an exhaust top dead center,
   wherein when the main exhaust valve is operated in a long duration mode, the closing time of the main exhaust valve is later than the exhaust top dead center, wherein the main exhaust valve is selectively operated in the short duration mode and in the long duration mode of which an opening duration of the main exhaust valve is longer than that of the short duration mode according to the control of the controller, and wherein the scavenge valve is selectively operated in a normal mode and a cylinder de-activation (CDA) mode of which the scavenge valve is closed according to the control of the controller.

2. The engine system of claim 1, wherein according to the vehicle operation state, the controller controls the main exhaust valve to be operated in the short duration mode and the scavenge valve to be operated in the normal mode.

3. The engine system of claim 1, wherein when the scavenge valve is operated in the normal mode, the scavenge valve is opened later than an opening time of the main exhaust valve and is closed later than the closing time of the main exhaust valve.

4. The engine system of claim 3, wherein a valve lift and a valve duration of the scavenge valve are smaller than a valve lift and a valve duration of the main exhaust valve.

5. The engine system of claim 3, wherein the scavenge valve is opened near the exhaust top dead center.

6. The engine system of claim 1, wherein valve profiles of the scavenge valve and the main exhaust valve are crossed at a valve lift of less than 2.0 mm.

7. The engine system of claim 1, wherein valve profiles of the scavenge valve and an intake valve are crossed at a valve lift of more than 80% of a maximum lift of the scavenge valve.

8. The engine system of claim 1, further comprising: a turbocharger,
wherein exhaust gas passing through the main exhaust manifold passes through a turbine of the turbocharger, and
a part of the exhaust gas passing through the scavenge manifold passes through a compressor of the turbocharger before entering the combustion chamber.

9. The engine system of claim 1, further comprising: an exhaust gas recirculation (EGR) cooler, and
wherein a part of the exhaust gas passing through the scavenge manifold passes through the EGR cooler before entering the combustion chamber.

10. The engine system of claim 1, wherein the scavenge exhaust port has a diameter smaller than that of the main exhaust port.

11. The engine system of claim 1, wherein according to the vehicle operation state, the controller controls the main exhaust valve to be operated in the long duration mode and the scavenge valve to be operated in the CDA mode.

12. An engine system comprising:
main exhaust ports fluidly communicating with each combustion chamber;
a main exhaust valve configured to be operated to close or open each main exhaust port;
a main exhaust manifold connected with the main exhaust ports;
scavenge exhaust ports fluidly communicating with each combustion chamber;
a scavenge valve configured to be operated to close or open each scavenge exhaust port;
a scavenge manifold fluidly connected with the scavenge exhaust ports;
an engine operation state detecting portion including an rpm sensor; and
a controller configured to control operations of the main exhaust valve and the scavenge valve according to an output signal of the engine operation state detecting portion,
wherein when the main exhaust valve is operated in a short duration mode, a closing time of the main exhaust valve is earlier than an exhaust top dead center,
wherein when the main exhaust valve is operated in a long duration mode, the closing time of the main exhaust valve is later than the exhaust top dead center,
wherein the main exhaust valve is selectively operated in the short duration mode and the long duration mode of which an opening duration of the main exhaust valve is longer than an opening duration of the short duration mode according to the control of the controller, and
wherein the scavenge valve is selectively operated in a normal mode and a CDA mode of which the scavenge valve is closed according to the control of the controller.

13. The engine system of claim 12, wherein the controller controls the main exhaust valve to be operated in the short duration mode and the scavenge valve to be operated in the normal mode according to a vehicle operation state including an rpm signal, and
wherein the controller controls the main exhaust valve to be operated in the long duration mode and the scavenge valve to be operated in the CDA mode according to the vehicle operation state.

14. The engine system of claim 12, wherein when the scavenge valve is operated in the normal mode, the scavenge valve is opened later than an opening time of the main exhaust valve and is closed later than the closing time of the main exhaust valve.

15. The engine system of claim 14, wherein the scavenge valve has a valve lift and valve duration smaller than a valve lift and a valve duration of the main exhaust valve;
wherein the scavenge valve is opened near the exhaust top dead center; and
wherein valve profiles of the scavenge valve and the main exhaust valve are crossed at a valve lift of less than 2.0 mm.

16. The engine system of claim 14, wherein valve profiles of the scavenge valve and an intake valve are crossed at a valve lift of more than 80% of a maximum lift of the scavenge valve.

17. The engine system of claim 14, wherein the scavenge exhaust port has a smaller diameter than that of the main exhaust port.

* * * * *